No. 759,627. PATENTED MAY 10, 1904.
W. A. McCURD.
MOTOR CYCLE STAND.
APPLICATION FILED MAY 29, 1903.
NO MODEL. 2 SHEETS—SHEET 1.
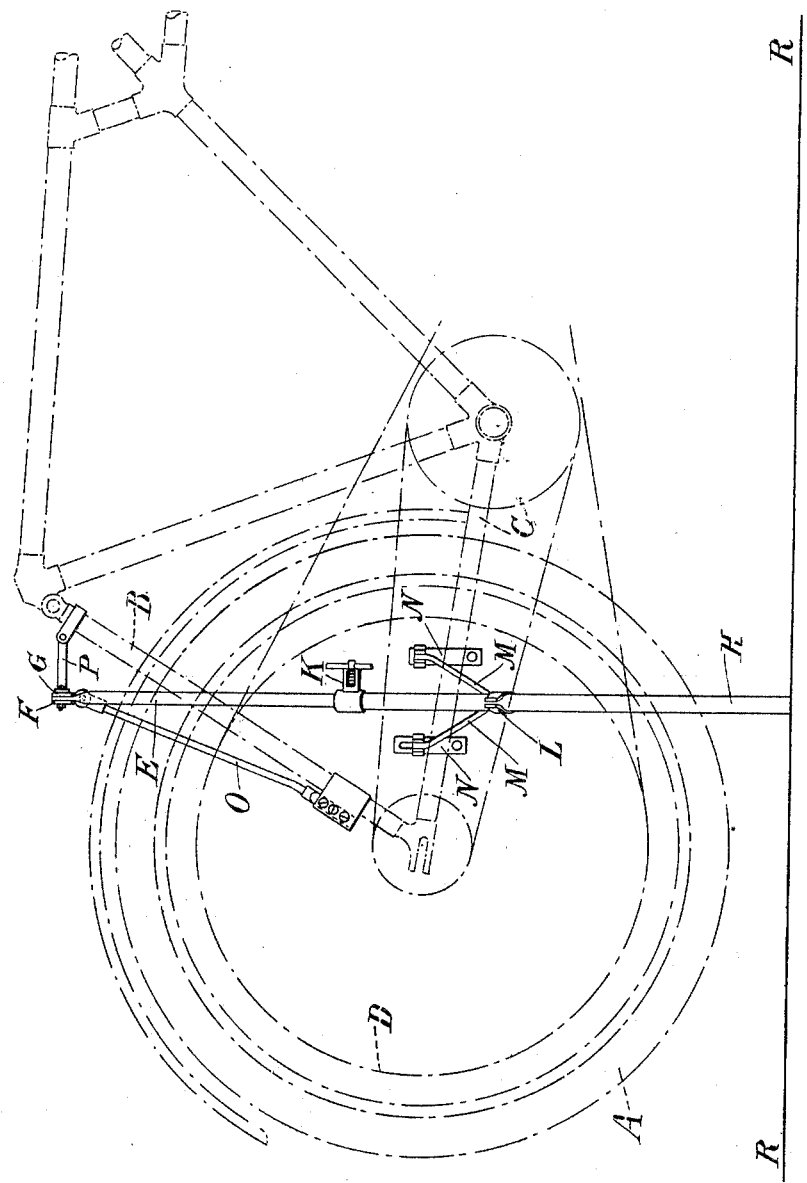
WITNESSES:
P. W. Wright
Walter Abb
INVENTOR
Wallace Atherton McCurd
BY
Howson and Howson
HIS ATTORNEYS No. 759,627. PATENTED MAY 10, 1904.
W. A. McCURD.
MOTOR CYCLE STAND.
APPLICATION FILED MAY 29, 1903.
NO MODEL. 2 SHEETS—SHEET 2.
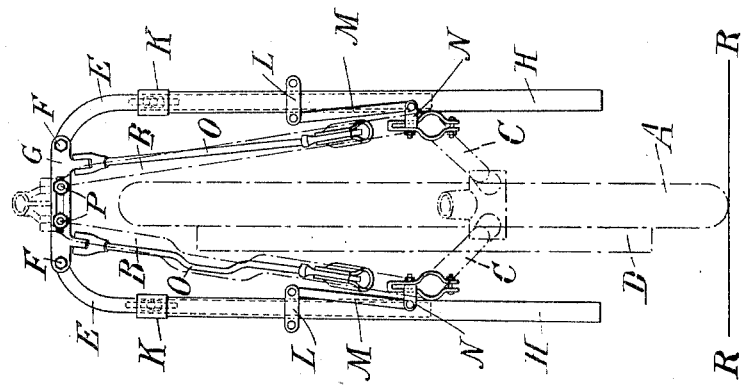
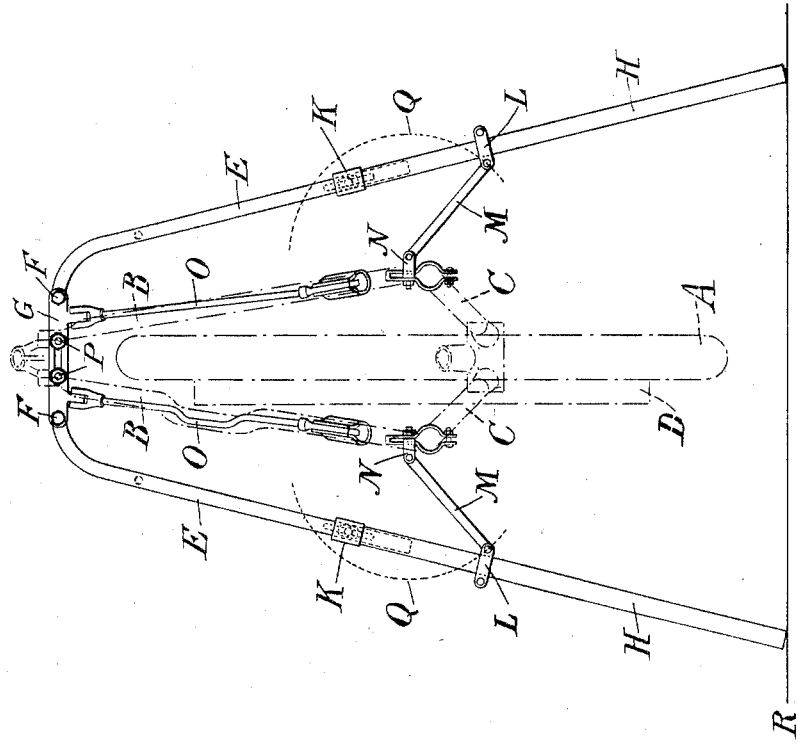
WITNESSES:
F. W. Wright
Walter Abb
INVENTOR
Wallace Atherton McCurd
BY
Howson and Howson
HIS ATTORNEYS No. 759,627. Patented May 10, 1904.

UNITED STATES PATENT OFFICE.

WALLACE ATHERTON McCURD, OF FOREST HILL, ENGLAND, ASSIGNOR TO EDGAR CHARLES THRUPP, OF WESTMINSTER, ENGLAND.

MOTOR-CYCLE STAND.

SPECIFICATION forming part of Letters Patent No. 759,627, dated May 10, 1904.

Application filed May 29, 1903. Serial No. 159,341. (No model.)

*To all whom it may concern:*

Be it known that I, WALLACE ATHERTON MCCURD, engineer, a subject of the King of Great Britain and Ireland, residing at 263 Stanstead road, Forest Hill, in the county of Kent, England, have invented certain new and useful Improvements in Motor-Cycle Stands and the Like, of which the following is a specification.

This invention relates to an improved device for "jacking up" or lifting and supporting the driving-wheel of motor-bicycles clear of the ground either for the purpose of facilitating repairs or for testing the engine or motor and mechanism or for keeping the cycle standing with or without the engine or motor at work. It is necessary to provide in such a device means by which it can be firmly connected with such a part of the cycle as will keep the device out of the way of the rider when he operates the pedals, and yet allow the support to be vertical, and with means whereby such stability is secured as is necessary to withstand the strains such a device is subjected to when used for supporting a motor-cycle.

The said invention comprises an upper stem member (preferably hollow) pivotally connected to means by which it can be connected to a convenient part of the frame of the cycle, as hereinafter described, and a lower stem member capable of sliding telescopically over or in the upper stem member, so as to elongate or shorten the stem as a whole. A fastening device, preferably consisting of a spring finger or bolt or the like, is provided to lock the two members of the stem together either in the shortened position, when the stem is clear of the ground, or in its elongated position, when the length of the stem is such as will raise or support the driving-wheel of the cycle clear of the ground. I pivotally attach a pair of arms to the sliding or lower member of the stem, the other end of the said arm being pivotally attached to the chain-stays or other convenient part of the frame of the cycle below the pivots on which the upper members of the stems turn, each of the arms of each said pair of arms being connected to the lower member of the stem in the same axial line and being connected separately to the frame of the cycle at some little distance fore and aft of the transverse plane in which the stems are situated. The said arms are arranged in such manner that when the sliding or lower member of the stem is moved down on or in the upper member the arms will guide the stem in an outward or lateral direction, and so increase the width of base necessary for maintaining the cycle safely in an upright position, the stems keeping their vertical position and the disposition of the arms at some distance on either side of the transverse plane in which the stems are situated giving great rigidity to the support when in use.

Two of these lifting or supporting devices are employed, one on either side of the cycle, so as to properly support the driving-wheel clear of the ground, when the engine or motor can be worked and motion imparted to the driving-wheel while the machine is not traveling. I pivot the upper members of the stem to a bridge-piece connected to the backstays of the frame by links secured by clips to each backstay.

I will now more particularly describe this invention with reference to the accompanying drawings.

In the drawings the parts of the bicycle are shown in dot-and-pick lines, while the device according to my invention is shown in full lines.

Figure 1 is a side elevation of the rear portion of a bicycle, and Fig. 2 is a back elevation, these figures showing the stems elongated and in use; and Fig. 3 is a back elevation showing the stems shortened and in the position they occupy when the stems are out of use.

A is the driving-wheel of the bicycle.

B B are the backstays of the frame, and C C are the chain-stays, and D D is the driving-pulley of the engine or motor.

E E are the upper members of the telescopic stems, pivoted by the pivot-pins F to the bridge-piece G. The lower members of the telescopic stems H are fitted with locking devices K, which engage in holes or recesses in the upper members E when the stems are elongated to the positions shown in Figs. 1 and 2 or when they are shortened to the position shown in Fig. 3.

L represents clips fixed to the lower members H of the stems and carrying pivots to which the arms M are connected, the other ends of the said arms being connected to pivots N, carried on clips attached to the chain-stays C at some distance apart, one on one side and the other on the other side of the transverse plane in which the stems are situated.

The bridge-piece G is connected rigidly to the backstays B by the links O and P. The link O on one side of the machine may be bent, as shown in Figs. 2 and 3, to clear the engine or motor driving-belt, In Fig. 2 the curved dotted lines Q Q indicate the path of the outer ends of the radial arms M M when elongating or shortening the telescopic stems.

R indicates the ground-line.

If desired, a spiral spring may be introduced into each of the stems to facilitate the downward movement of the lower members.

I claim as my invention—

1. Stands for motor-bicycles, having telescopic, extensible stems, locking devices therefor, a bridge-piece secured to the bicycle and adapted to support it, links from said bridge-piece adapted to be attached to the backstays of the bicycle, the upper members of said stems being also pivoted to said bridge-piece so as to be movable outwardly at right angles to the bicycle, substantially as described.

2. Stands for motor-bicycles, having telescopic extensible stems, locking devices therefor, pivoted upper ends to said stems, a pair of pivoted connecting-arms secured to each lower member of said stems and adapted to be attached to the cycle-frame, the arms of each pair being provided with clips adapted to be attached to said frame on each side of the transverse plane in which said stems are situated, substantially as described.

3. Stands for motor-bicycles, having telescopic extensible stems, locking devices to lock the stems in lengthened or shortened position, a bridge-piece secured to the cycle, links pivoted thereto and clips therefor adapted to be connected to the backstays of the cycle, the stems being pivoted to said bridge-piece, in combination with pairs of arms, each pair pivotally connected between one of the lower members of the stems and the frame of the cycle, clips for each arm adapted to be secured to the frame, one on each side of the transverse plane in which the stems are situated, substantially as described.

In testimony whereof I affix my signature in presence of two witnesses.

WALLACE ATHERTON McCURD.

Witnesses:
WILLIAM GERALD REYNOLDS,
WILLIAM JOHN WEEKS.